UNITED STATES PATENT OFFICE 2,582,956

ACTIVATING CLAY BY ROASTING WITH ADMIXED ACID SALTS

George R. Bond, Jr., Paulsboro, N. J., assignor to Houdry Process Corporation, Wilmington, Del., a corporation of Delaware No Drawing. Application February 5, 1948, Serial No. 6,551

15 Claims. (Cl. 252—450)

The present invention relates to the preparation from naturally occurring hydrosilicates of aluminum, such as earths and clays, of industrially utilizable products of improved properties including enhanced adsorptivity. The invention is more particularly concerned with the activation of relatively inactive materials of this general class as well as with enhancement of the catalytic or other properties of such materials of this class which already have in their raw or processed state greater or less catalytic activity. An important aspect of the invention involves the preparation of or improvement in catalysts for use in hydrocarbon conversion operations.

Certain clays, such as the sub-bentonite clays of the montmorillonite series, have relatively poor adsorptivity and decolorizing activity in their raw state and are also substantially inert or impractical for use in this state as hydrocarbon conversion catalysts. By a familiar treatment with mineral acid, these clays become activated; and such acid activation of these clays has been widely employed to produce the well-known acid-activated clays of commerce, which are used as adsorptive decolorizing agents for oils and as catalysts in hydrocarbon conversion operations such as cracking.

There are many common and abundant clays, however, such as kaolins (including halloysite clays) which do not respond to the conventional methods of activation to produce catalysts having cracking activity at levels comparable with that of the aforementioned commercial acid activated sub-bentonite clays, nor do these clays possess after acid treatment comparable or desired decolorizing activity.

I have found, in accordance with the present invention, that natural hydrosilicates of aluminum including clays of the kaolin types as well as sub-bentonite clays can be improved in useful properties by a treatment involving roasting of these clays in admixture with certain acid reacting salts, such as salts demonstrating strong acid reaction upon hydrolysis or salts dissociating at elevated temperature to provide in the mass during roasting acidic radicals or components. As subjected to the roasting the clay-salt mix is preferably in the physical form desired for its use as catalyst, for example, as molded or otherwise agglomerated units. Following this roasting, the clay-salt mix is washed to desired extent to remove all or part of soluble conversion products and impurities present therein. By the novel process of the invention relatively inactive clays and earths are transformed into active masses useful as hydrocarbon conversion catalysts. Particular clays already having fair to good activity in raw or prepared state, such as certain kaolin clays or acid-activated sub-bentonite clays, may be further improved in useful properties by treatment in accordance with the invention.

The described treatment of the invention is applicable not only to clays such as those of the montmorillonite and kaolin type, including halloysites in the latter class; but also to other natural siliceous mineral products, particularly those containing aluminum compounds in greater or less proportion, including fuller's earth, bauxite, feldspar and the micaceous minerals.

The salts employed for admixture with the clay or other siliceous mineral to be roasted must be one that retains an acidic reaction throughout the entire period required for effecting treatment, either as the salt itself or the residue of a decomposed salt. Accordingly there may be employed salts of strong acids and weak bases which are not substantially volatilized as such during the roasting operation, for instance at a temperature of 600° F., as well as salts which do decompose at or below the treating temperature, provided in the latter case, that an acidic component of the salt is retained as a residue in the mass for a sufficient period to effect the required treatment. The salts employed may be those providing volatilizable cations leaving an acidic residue, or having soluble cations removable by the liquid used in the subsequent washing operation. Salts may also be employed which result on roasting in the formation of an insoluble residue containing the cationic component, provided that such residue is not detrimental to the activity or other properties of the ultimate catalyst. Advantageously, salts are selected which result in residual refractory metal oxides having catalytic activity in association with silica, as for use in hydrocarbon cracking operations.

Among the salts that may be used for admixture with the siliceous mineral to be processed, there are included sulfates of ammonium, zirconium, aluminum, beryllium, magnesium, zinc, etc. Acid salts of the alkali metals, such as potassium acid sulfate, also come into consideration, as well as salt complexes such as ammonium alum. Chlorides and oxychlorides (such as zirconyl chloride) or other halides of the named metals which are non-volatile as such at the treating temperature and pressure and otherwise possess the properties heretofore mentioned may also be employed.

With many salts, and particularly those hereinbefore specifically named, the process may be carried out at atmospheric pressure. With salts which as a whole or whose cations are volatilized to major extent at atmospheric pressure and at the temperature employed, elevated pressures can be availed of to prevent such volatilization or reduce the rate thereof.

The selected salt of acidic reaction as heretofore explained, such as one or more salts of the type listed, may be incorporated with the siliceous mineral simply by grinding these together. It is preferred, however, to dissolve or disperse the salts in water, so that better homogeneity may be obtained in the mix. Thus, the siliceous mineral and the salt may be formed into a paste or slurry, which is dried; and the obtained mass broken up into small particles, granules or larger agglomerates of desired size for further processing. Desirably the paste may be formed with suitable adjustment of water content into more regular shapes such as tablets or pellets by extrusion or other types of molding.

To obtain the beneficiation of the siliceous materials as heretofore indicated, the dried agglomerates including the incorporated salt or salts are heated to 600° F. or above to temperature sufficiently high to effect decomposition or dissociation of the salt, furnishing acidic components or residues reacting with certain components of the original siliceous material. By this treatment a portion of the metallic components of the clay or other siliceous mineral such as those of aluminum and of iron, if present, combine with the acidic radicals to form salts of these metals. In the preparation of adsorptive contact masses or catalysts, temperatures above about 1500° F. should be avoided. The preferred treating temperature lies in the range of 800 to 1200° F.

Although the reaction at these temperatures may take place almost instantaneously, to assure thorough heating of the mass internally to desired processing temperature, the reactants should be held at that temperature for at least a short period, say of about ten to fifteen minutes up to about an hour. Many minerals and particularly kaolin type clays are benefitted by maintaining the same at the elevated temperature for a longer period, as for two hours or more. As may be expected, at the higher temperatures of treatment within the described range, less time may be required to obtain the same severity of treatment. No particular advantage has been found for extending the heating period beyond that generally indicated above, nor is there any known detrimental effect resulting therefrom.

For heating of the siliceous masses and incorporated salt, no special type of equipment is required. The heating may be effected in a static or moving atmosphere, and may be carried out as a batch or continuous process.

The heat-treated material is then cooled or permitted to cool to desired temperature for further handling or processing. Thus, the cooled mass is subjected to suitable washing to remove appreciable amounts of soluble materials contained therein. Because of the physical condition of the material, efficient and rapid washing is possible, with easy separation of the wash liquors.

Removal of such soluble materials may be effected simply by water washing. Mineral-free water such as distilled water or that prepared by known ion-exchange methods is preferably employed. Ordinary temperatures can be used for the water wash, but more efficient washing results from the use of warm to hot water, including temperature up to the atmospheric boiling point. Higher temperatures are possible with the use of super-atmospheric pressure, thereby combining the desirable effects of high pressure hot water treatment as described in a copending application of Hubert A. Shabaker, Serial No. 764,559, filed July 29, 1947 (issued as U. S. Patent 2,477,664, August 2, 1949).

Instead of using water, the washing may be effected with acidic aqueous solutions such as those of mineral or organic acid, alone, alternately with, or preceding or following the water washing treatment. This would be the case particularly if the heat treated residue is not highly acidic in itself. In this manner certain water insoluble but acid soluble materials such as a portion of the incorporated salt or its residue and/or of water insoluble aluminaceous materials of the mineral is removed, often effecting thereby up to a particular maximum, further increase in adsorptive properties and in catalytic activity.

Although it is generally preferred to continue the washing operation until all water-soluble salts have been removed from the mass, it may be found at times unnecessary to effect such complete removal and in some instances even advantageous to permit a small proportion of such salts to remain in the mass. In instances where the added acidic salt introduces alkali metal components, the washing step should also desirably include treatment with base exchange solutions, such as those of ammonium chloride or sulfate, to effect substantial removal of zeolitically held alkali metal ions.

The washed material is subsequently dried in any known or desired manner. Since the treated clay mass has already been subjected to heat treatment at elevated temperature, further calcination is not required previous to its use as catalyst. If desired, however, known heat treatment in air, steam, or mixtures of these, for conditioning of the product and stabilization of catalytic activity, may be carried out, prior to use of the products of the invention as catalysts in hydrocarbon conversion operations.

The spent wash solutions obtained in the washing step above described need not be discarded, but can be directly reused in the process or purified or processed for recovery of valuable salts or other materials therefrom. Thus, zirconium or aluminum sulfate present in the wash water is utilizable for further treatment of siliceous minerals in accordance with the invention. Where ammonium salts are employed, substantial amounts of volatilized ammonia can be recovered and reused.

The catalytic activity and behavior of contact masses can be measured and compared on the basis of results shown in cracking hydrocarbon oils under standardized test conditions. One such test in common use is that known as the CAT-A method, described by J. Alexander and H. G. Shimp in National Petroleum News, Technical Section, August 2, 1944; beginning at page R537. In accordance with the described method, a light East Texas gas oil is contacted with the catalyst at a temperature of approximately 800° F. under superatmospheric pressure and at a liquid space rate of 1.5 (volume charge/volume of catalyst/per hour) for a ten minute operation period. The volume of gasoline of 410° F. cut point is measured and expressed as a percentage of the volume of oil charged, thereby designating the characteristic activity of the catalyst. In addition, the quantity of carbonaceous deposit formed in the catalyst is also usually measured and expressed in terms of weight percent of charge, and the specific gravity and weight percent of gas produced is also determined.

*Example I*

The treatment of the invention was carried out with a raw montmorillonite clay from the Kinney mines in Ash Meadows, Nevada, showing sub-bentonite characteristics and having the following typical analysis on a dry basis (105° C.):

| | Parts by weight |
|---|---|
| Ign. loss (1600° F.) | 9.97 |
| Si as $SiO_2$ | 57.6 |
| Al as $Al_2O_3$ | 22.9 |
| Fe as $Fe_2O_3$ | 1.9 |
| Ca as CaO | 2.2 |
| Mg as MgO | 4.8 |
| Na+K as $Alk_2O$ | 0.77 |
| Mn | Present |

The above clay calcined in raw state shows a typical activity by the CAT-A method of 7.1% gasoline by volume of oil charged.

(a) The above raw clay was admixed with a commercial acidic zirconium sulfate solution known as "Zircotan" (7.8% $ZrO_2$, 28.6% $SO_4$ by weight) in the proportions of 6000 grams of clay per liter of the solution, providing 3.7% zirconium sulfate by weight of raw clay, and water was added thereto in sufficient amount to plasticize the clay (water in about twice the volume of the zirconium salt solution was required). The obtained paste was cast into pellets and dried. Surprisingly, there was no evidence of shrinking or cracking as is the case with raw clays thus cast and dried.

The dried pellets were heated to 1000° F. in a muffle furnace and held at this temperature for one half hour. No marked shrinkage of the pellets was observed and only insignificant cracking.

After cooling, the pellets were washed in warm water (40–50° C.) to remove substantially all of the water soluble salts and then dried. Water soluble materials removed in the washing constituted 3.5% by weight of the mass; as salts of calcium, magnesium, aluminum and manganese, with lesser amounts of iron and zirconium salts. The dried pellets had an apparent density of 1.015 kg./lit.; as measured by weighing a packed fixed volume of the pellets.

Tested for cracking of the standard light gas oil under CAT-A conditions without further heat treatment, there was obtained from the charge stock a yield of 32.3 volume percent gasoline.

(b) Following generally the procedure above outlined the same raw clay was treated with aqueous zirconyl chloride solution, employing .16 part of $ZrOCl_2$ on clay weight in sufficient water to plasticize the clay. The clay-salt mix was roasted at 1000° F. for one hour, followed by water washing.

The dried pellets had an apparent density of 1.15 kg./lit. Tested for activity by the CAT-A method, the treated clay produced from the charge stock a yield of 28% by volume gasoline.

*Example II*

The same raw clay as in the preceding example was similarly treated with the commercial zirconium sulfate solution, except that about 4 times the previous volume of solution was employed with the same quantity of clay (15% zirconium sulfate by weight of raw clay). Only a small amount of water was necessary to be added to obtain sufficient plasticity for molding the mass.

The obtained paste was cast as pellets, dried, and roasted at 1000° F. for half hour. No appreciable shrinkage or breakage was observed.

The cooled pellets were washed with successive portions of warm water as before, and the wash water accumulated. No disintegration occurred during washing. Analysis of the wash water indicated that a portion of the added zirconium was removed together with a large quantity of salts of aluminum as well as lesser quantities of manganese, iron, calcium and magnesium.

The obtained washed pellets had an apparent density of 0.845 kg./lit. and showed a water absorption of 36.5% of their weight; the raw clay similarly tested absorbs only 5.7% water.

The obtained pellets were employed without further heat treatment, for cracking of a light gas oil under CAT-A conditions. There was produced a gasoline yield of 44.7% by volume of the oil charged.

The catalyst moreover was found to have good steam stability, as determined by an accelerated steam deactivation test. Thus, the above pellets, after regeneration, were subjected to treatment in 100% steam at 1250° F. for 4 hours and retested by the CAT-A method. There was produced from the charge stock 36.9% by volume gasoline; the resulting coke and gas, however, were reduced to about half of that previously obtained.

The above gasoline yield obtained with the steam treated pellets compares favorably with that characteristic of pellets obtained from the same raw clay after acid-activation in conventional manner (0.40 $H_2SO_4$ to dry clay weight at 93° C. for 6 to 8 hours), and conditioned by similar steam treatment (average 32.3% gasoline).

*Example III*

(a) The same raw clay as in Examples I and II was admixed with an aqueous solution of ammonium sulfate in a concentration of 192 grams per liter, employing 1200 grams of clay per liter of solution (furnishing ammonium sulfate of 16% by weight of the clay). The obtained paste was cast into pellets and dried, then slowly heated in a stream of air to 1000° F. and held at this temperature for one-half hour. Ammonia was evolved as the temperature reached about 600° F., and 60% of the added $NH_4+$ was recovered from the volatilized product during the roasting period.

After cooling, the pellets were washed in water as in the previous examples. No appreciable breakage or disintegration of the pellets was evidenced before or after washing.

Of the mass subjected to roasting 2.5% by weight was volatilized as $NH_3$, and 0.6% as volatile ammonium salts; 13.3% of the mass was removed by water washing. The washed pellets had an apparent density of 0.98 kg./lit.

The obtained pellets, without further heat treatment except for drying, were employed in cracking the standard light gas oil under CAT-A conditions, with a resulting yield of 33.4% gasoline by volume of oil charged.

(b) Following generally the procedure above outlined sodium bisulfate was substituted for the ammonium sulfate, employing 42 parts by weight of NaHSO₄·H₂O per 100 parts clay and heating of the clay-salt mix for one hour at 1000° F. The dried water washed pellets obtained a yield of 25% by volume gasoline by the CAT-A method. The dried pellets had a density of 0.71 kg./lit.

It will be noted that in the above examples pellets of unusually high density were obtained as compared with the conventional pelleted synthetic gel and commercial acid activated subbentonite clay catalysts. This high density and resulting improved heat capacity renders the catalysts of the invention exceptionally suited and particularly advantageous for use in operations wherein the sensible heat content of the catalyst is relied upon in whole or in part to furnish heat in the endothermic hydrocarbon conversion reactions.

Example IV (a) The same raw clay in the preceding examples was admixed with magnesium chloride solution equivalent to 20 parts MgCl₂ per 100 parts of clay by weight, in sufficient water to render the clay plastic, and the clay-salt mix was formed into pellets and heated for 2 hours at 1000° F.

After cooling, pellets were water washed and dried. The dried pellets which had an apparent density of 1.07 kg./lit. were then employed in cracking of a light gas oil under CAT-A conditions followed by regeneration to burn off carbonaceous deposit. The regenerated pellets were removed from the reactor, and after cooling, the pellets were leached with aqueous hydrochloric acid solution of 5% concentration for two hours on a steam bath, using an amount of acid equivalent to 8.6 parts (100% HCl) per 100 parts of clay. The acid treated pellets were then washed with water until chloride free.

The acid treated and dried pellets (which now had a density of 0.99 kg./lit.) were employed in cracking of the standard light gas oil under CAT-A conditions and obtained a yield of approximately 30% gasoline by volume of charge.

(b) The procedure above outlined was repeated substituting zinc chloride for the magnesium chloride solution, employing 20 parts ZnCl₂ per 100 parts of clay by weight. The 5% hydrochloric acid solution corresponded to 8.3 parts acid (100% HCl) per 100 parts clay. The only water-washed pellets had an apparent density of 1.05 kg./lit., and the acid-washed pellets 1.00 kg./lit. The latter obtained a yield of 21.6% by volume gasoline in cracking under CAT-A conditions.

Example V

The clay employed in this example was a kaolin obtained from the United Clay Mines in the vicinity of Crossley, Florida, known commercially as Putnam kaolin, and having the following typical analysis on a dry basis:

| | Parts by weight |
|---|---|
| Ign. loss | 14.15 |
| Si as SiO₂ | 46.4 |
| Al as Al₂O₃ | 38.6 |
| Fe as Fe₂O₃ | 0.38 |
| Ca | Tr. |
| Mg as MgO | 0.19 |
| Na as Na₂O | 0.43 |
| K as K₂O | 0.35 |
| Ti as TiO₂ | 0.24 |

The average activity of this clay, pelleted and calcined in raw state, by the CAT-A method is about 12.5 vol. per cent gasoline.

The above raw clay was admixed with the commercial zirconium sulfate solution employed in Examples I and II in the proportion of about 1500 grams clay per liter of the solution (corresponding to 6.8% ZrO₂ on weight or raw clay).

The obtained paste was cast into pellets and heated at 1000° F. for a half-hour. The thus roasted pellets were then washed in warm water as in the preceding examples. Partial disintegration of the pellets took place during washing, indicating that if the pellet is desired to be maintained intact during subsequent processing, a higher temperature (or longer time) should be employed in the roasting of clays of this type to provide pellets better resisting disintegration. Washing was continued until the accumulated wash water was equal to about 5 times the volume of the salt solution initially employed.

The leached material had an apparent density of 0.78 kg./lit.

The disintegrated portion of the washed pellets was reground, and recast as pellets with addition of water to suitable consistency for the purpose, then dried. The pellets thus obtained were added to the unbroken dried pellets from the previous operation.

The obtained mixture of pellets was tested without further heat treatment for cracking under CAT-A conditions, obtaining a yield of 31.0% by volume of gasoline.

In the use of the contact masses prepared in accordance with the present invention as catalysts for conversion of hydrocarbons, the usual conditions of cracking can be availed of without modification, the contact mass being in the form of fine particles, granules, globules, pellets or the like. The described catalysts can be employed in fixed bed processes for cracking of petroleum fractions as well as in processes in which the catalyst moves through the reaction zone. As an example of a fixed bed operation, cracking may be carried out at a temperature of 800–900° F., employing a space rate (volume of charge liquid basis per volume of catalyst per hour) of about 1.5 and a pressure of about 15 pounds per square inch gauge. The temperature, of course, may be varied within the range of about 700 to 1100° F., the space rate within the range of about 0.5 to 8 and pressures may be employed from about atmospheric or slightly lower up to about 100 pounds per square inch or higher. Under these conditions the operating period "on stream" may range from five to sixty minutes, for example 10 to 30 minutes alternating with regeneration periods. In commercial operation temperatures above 800° F. are preferred. Steam may be added to the charge stock and is particularly advantageous in assisting the vaporization of heavier stocks.

In processes other than the fixed bed, such as where the catalyst moves or is moved through the reaction zone, the conditions employed may be such as to subject the oil to substantially equivalent conditions including contact time and ratios of oil to catalyst as those set out above in connection with the fixed bed process.

Reforming may be carried out in accordance with the invention by charging a virgin or cracked gasoline or naphtha fraction under conditions similar to those employed in cracking.

Whereas in the fixed bed operation the catalyst is alternately subjected to regeneration, in the other processes the catalyst is passed during its cycle through a separate regeneration zone. In all of these processes regeneration is effected by contacting the catalyst after use, with air of other oxygen-containing gas to burn off carbonaceous deposit.

The catalysts of the present invention also find use generally in other hydrocarbon conversion processes wherein the usual active silica-alumina catalysts can be employed, including synthesis reactions; for example, polymerization of gaseous hydrocarbons to liquid products.

Obviously many modifications and variations of the invention as hereinbefore set forth may be made without departing from the spirit and scope thereof and therefore only such limitations should be imposed as are indicated in the appended claims.

I claim as my invention:

1. The process of treating natural hydrosilicates of aluminum which comprises the steps of admixing such a hydrosilicate with a salt of a mineral acid furnishing acidic components which are not substantially volatilized as such at the treating temperature hereinafter defined, said salt being one incapable of forming on heating an insoluble cation-containing residue detrimental to catalytic activity; heating the mixture of hydrosilicate and salt to at least 600° F., but not in excess of 1500° F., and washing the obtained reaction product to remove any water soluble conversion products thus formed.

2. The process of beneficiating natural hydrosilicates of aluminum which comprises thoroughly incorporating with such a hydrosilicate a solution of a salt demonstrating in aqueous solution strong acid reaction, heating the mixture to a temperature above about 600° F., but not above about 1500° F., and washing the obtained reaction product in an aqueous medium to remove water soluble materials therefrom; said salt being incapable of forming as a result of said heating an insoluble cation-containing residue detrimental to catalytic activity of said hydrosilicate.

3. The process in accordance with claim 2 wherein said natural hydrosilicate of aluminum employed as starting material is a clay.

4. The process in accordance with claim 2 wherein said natural hydrosilicate of aluminum employed as starting material is a raw acid-activatable sub-bentonite clay.

5. The process in accordance with claim 2 wherein said natural hydrosilicate of aluminum is a kaolin clay.

6. The process of forming adsorptive contact masses from clay which comprises incorporating in said clay a dissociable salt of acid reaction not volatilized as such at 600° F., forming the obtained mix into solid agglomerates, heating the agglomerates at a temperature in excess of 600° F. and not greater than 1500° F., cooling and washing the cooled product in aqueous medium to remove soluble conversion products formed from components of said clay; said salt containing a mineral acid anion and being incapable of forming as a result of said heating an insoluble cation-containing residue detrimental in said adsorptive contact masses.

7. The process of claim 6 wherein said salt is an ammonium salt.

8. The process of claim 6 wherein said salt is ammonium sulfate.

9. The process of claim 6 wherein said salt is a zirconium salt.

10. The process of claim 6 wherein said salt is zirconium sulfate.

11. The process of activating a sub-bentonite clay which comprises incorporating with such a clay an aqueous solution of an acid reacting salt to form a wet mix of moldable consistency, forming said mix into shaped masses, roasting said masses at a temperature in the range of 800–1200° F., cooling said masses and washing the same in an aqueous medium and drying the masses; said salt containing a mineral acid anion, being non-volatile as such at 600° F., and being incapable of forming as a result of roasting an insoluble cation-containing residue detrimental to the activity of said clay.

12. The process of claim 11 wherein said acid reacting salt comprises zirconium sulfate.

13. The process of claim 11 wherein said acid reacting salt comprises ammonium sulfate.

14. The process of preparing high density catalyst pellets from a montmorillonite clay which comprises incorporating with said clay an acidic aqueous solution of a zirconium salt of a mineral acid to form a pasty mix, forming said mix into pellets, roasting said pellets at about 800-1200° F., washing said pellets in an aqueous medium to an extent sufficient to remove a substantial portion of soluble aluminum salts present therein as a result of reactions during the roasting step, and drying the washed pellets.

15. The process of improving the catalytic activity of a kaolin clay which comprises incorporating in said clay and acid-reacting salt in an aqueous medium, heating the obtained pasty mix to at least 600° F. but not in excess of 1500° F., washing the product in aqueous medium, granulating the product, adjusting the water content to form from the ground product a wet mass of moldable consistency, and molding the mass into agglomerates of desired size, said acid-reacting salt containing a mineral acid anion, being non-volatile as such at 600° F., and being incapable of forming as a result of said heating an insoluble cation-containing residue detrimental to the catalytic activity of said clay.

GEORGE R. BOND, Jr.

REFERENCES CITED

The following references are of record in the file of this patent:

UNITED STATES PATENTS

| Number | Name | Date |
|---|---|---|
| 1,590,640 | Mii | June 29, 1926 |
| 1,716,828 | Merrill | June 11, 1929 |
| 2,018,987 | Wirzmuller | Oct. 29, 1935 |
| 2,306,993 | Loverll et al. | Dec. 29, 1942 |
| 2,371,890 | Herold et al. | Mar. 20, 1945 |

FOREIGN PATENTS

| Number | Country | Date |
|---|---|---|
| 275,203 | Great Britain | July 12, 1928 |
| 490,853 | Great Britain | Aug. 23, 1938 |